United States Patent [19]
Kamio

[11] Patent Number: 4,606,448
[45] Date of Patent: Aug. 19, 1986

[54] SUPPLY PRESSURE CONTROL DEVICE FOR AIR CLUTCH

[75] Inventor: Takenori Kamio, Osaka, Japan

[73] Assignee: Kabushiki Kaisha Daikin Seisakusho, Osaka, Japan

[21] Appl. No.: 648,975

[22] Filed: Sep. 10, 1984

[30] Foreign Application Priority Data

Sep. 29, 1983 [JP] Japan .................. 58-182276
Sep. 30, 1983 [JP] Japan .................. 58-184082

[51] Int. Cl.[4] .................................. F16D 25/02
[52] U.S. Cl. ........................... 192/85 R; 192/99 S; 91/434
[58] Field of Search .......... 192/85 R, 99 S, 3.57; 91/433, 434; 92/6 R; 137/625.69, 625.66

[56] References Cited

U.S. PATENT DOCUMENTS

| | | | |
|---|---|---|---|
| 3,351,169 | 4/1965 | McIndoe | 192/85 R |
| 4,487,304 | 12/1984 | Young | 192/85 R |
| 4,492,149 | 1/1985 | Bouteille et al. | 137/625.66 X |

Primary Examiner—George H. Krizmanich
Attorney, Agent, or Firm—Burns, Doane, Swecker & Mathis

[57] ABSTRACT

A supply pressure control device for an air clutch providing a valve for controlling a pressure of compressed air supplied to the air clutch, providing a pneumatic feed-back mechanism giving an air clutch supply pressure to said valve in the direction of reducing pressure, providing a control spring elastically urging said valve in the direction of increasing pressure against the pneumatic feed-back mechanism, providing a spring bearing changing an urging force of the control spring, interconnecting the spring bearing to a clutch pedal in order to actuate the spring bearing in the direction of weakening the urging force of the control spring when the clutch pedal is stepped on, and providing a stepping force loading mechanism withstanding the stepping-on of the clutch pedal.

10 Claims, 9 Drawing Figures

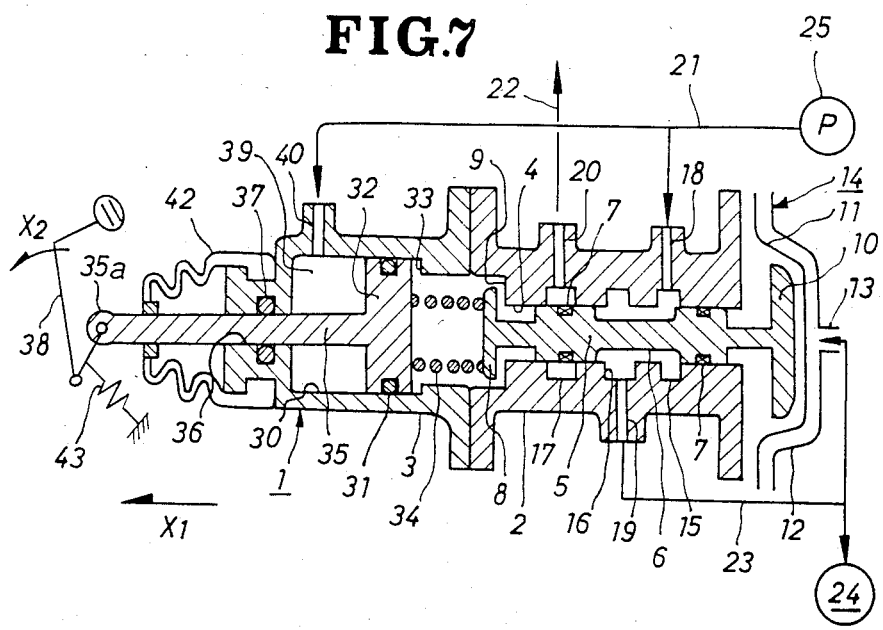
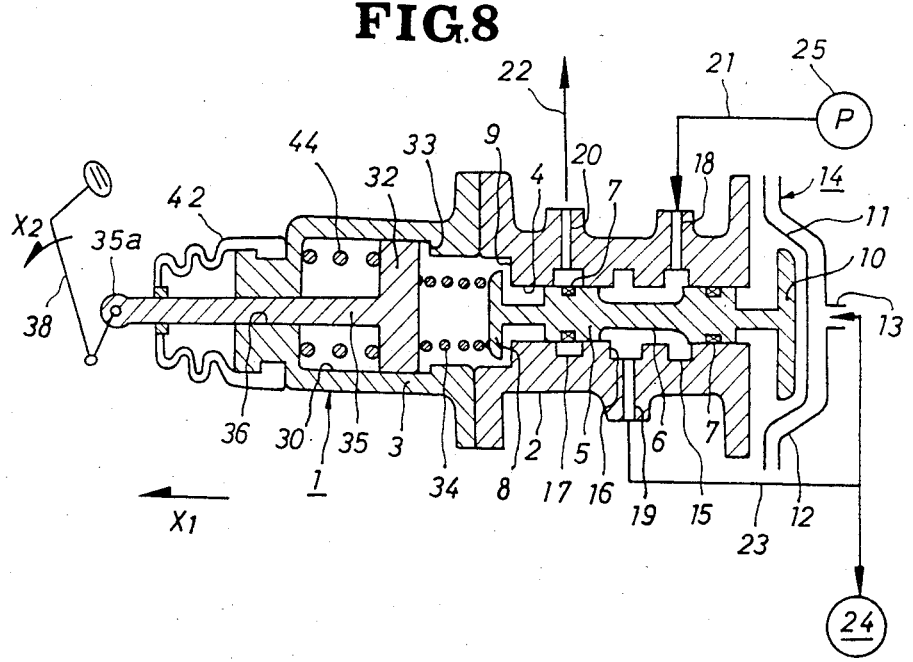

SUPPLY PRESSURE CONTROL DEVICE FOR AIR CLUTCH

FIELD OF THE INVENTION

This invention relates to a supply pressure control device for air clutch suitable mainly for a vehicle.

DESCRIPTION OF THE PRIOR ART

Conventionally, in a large vehicle, an air brake utilizing compressed air has been employed to obtain a large braking force with a small stepping pressure. In such a large vehicle etc., a large force generally becomes necessary also in engaging and disengaging a clutch so that an effective air clutch system is needed.

SUMMARY OF THE INVENTION

An object of this invention is to enable realization of an air clutch permitting an operator to perform engaging/disengaging work easily with a small force by providing a supply pressure control device which interrupts actuation of an air clutch.

In order to accomplish the above object, this invention has the following features.

(a) A valve is provided which controls a pressure of compressed air supplied to the air clutch.

(b) A pneumatic feed-back mechanism is provided which gives said valve an air clutch supply pressure in a direction of reducing pressure.

(c) A control spring is provided which elastically urges said valve in a direction of increasing pressure against the pneumatic feed-back mechanism.

(d) A spring bearing is provided which changes an urging force of the control spring.

(e) The spring holder is interconnected to a clutch pedal so that the spring bearing is actuated in a direction of reducing the control spring force when the clutch pedal is stepped on or depressed.

(f) A stepping force loading mechanism is provided which withstands the stepping-on of the clutch pedal, is provided.

BRIEF DESCRIPTION OF THE DRAWINGS

FIGS. 7, 8, and 9 are vertical sectional schematic drawings of further another embodiments corresponding to FIGS. 1, 3, and 4 respectively.

BRIEF DESCRIPTION OF THE PREFERRED EMBODIMENTS

Figure 1:
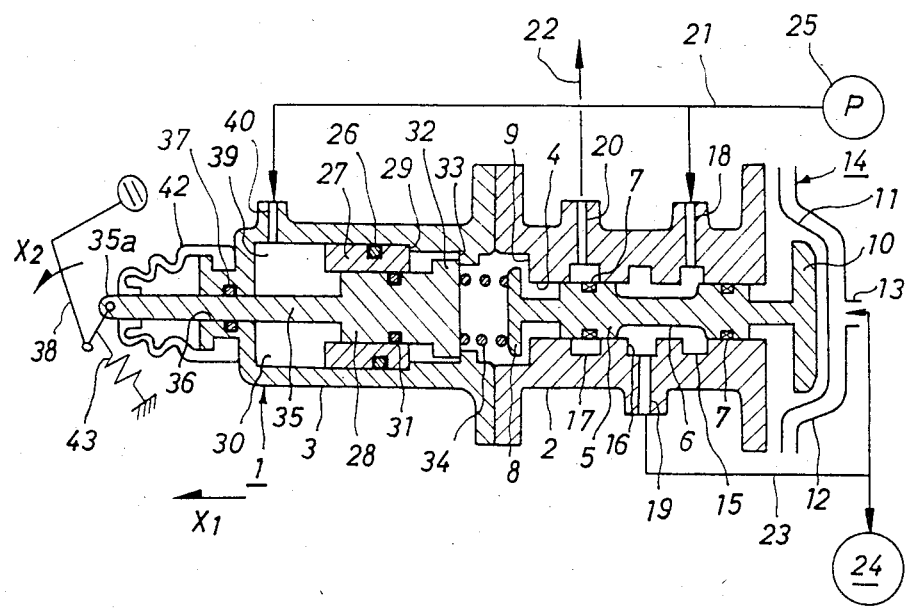
FIG. 1 is a vertical sectional schematic drawing of the supply pressure control device according to this invention.

In FIG. 1, a supply pressure control device body 1 is an approximately column-shaped member mainly comprising a valve part 2 and a cylinder part 3 connected to each other. The valve part 2 has an axial hole 4 at its center portion, and a spool valve 5 fits freely slidingly in the hole 4. The spool valve 5 has an annular groove 6 at its central outer periphery, and has a ring-shaped seal 7 at each side of the groove 6, on the outer periphery. A disc-like spring bearing 8 is fixed to a central projection of the valve 5 on a side facing the cylinder part 3 and the spring bearing 8 fits in a recess 9 formed at the side end portion of the valve part 2 facing the cylinder part 3. A disc-like diaphragm bearing 10 is provided on a central projection at an opposite end of the spool valve 5 (right side of FIG. 1) and the diaphragm bearing 10 projects outwardly from the valve part 2. The diaphragm bearing 10 is covered with a diaphragm 11, and an outer peripheral part of a diaphragm cover 12 covering the diaphragm 11 is airtightly secured to the valve part 2 and simultaneously holds an outer peripheral part of the diaphragm 11. An air clutch supply pressure port 13 is provided at a central part of the cover 12, and a pneumatic feed-back mechanism 14 is formed of the diaphragm 11, the cover 12 etc. Three annular grooves 15, 16, 17 are provided in the hole 4 with axial spaces disposed therebetween, air holes 18, 19, 20 opening radially outwardly are connected to each groove 15, 16, 17. The air hole 18 disposed next to the diaghragm bearing 10 is connected to a piping 21 interconnected to an air source 25 (for example, of 2.5 kg/cm$^2$), and the air hole 20 disposed next the spring bearing 8 is connected to an exhaust pipe 22. The centrally disposed air hole 19 is connected to a branched piping 23 one side of which is connected to the supply port 13 and the other side of which is connected to an air clutch 24. The air clutch 24, details of which are omitted here, is so constructed as to be engaged when the supply pressures rises and disengaged when it drops.

A concentric hole 30 opening to the hole 4 is formed in the cylinder part 3 and a cylindrical member 27 having a ring-shaped seal 26 on its outer periphery fits in the hole freely slidingly. A column 28 formed integrally with a spring bearing 32 fits freely slidingly in the member 27 through a ring-shaped seal 31, thus the spring bearing 32 will be held concentrically in the hole 30. A shouldered part 29 limiting a sliding motion of the member 27 is formed at an axially intermediate position of the hole 30, and a shouldered part 33 limiting a sliding motion of the spring bearing 32 is formed at side of the hole 30 next to the valve part 2. An axial coil-shaped control spring 34 is compressively provided between the spring bearing 32 and the spring bearing 8. A concentric rod 35 projecting toward the bottom of the hole 30 is provided at the center of the column 28, and a tip end of the rod 35 fits in and through a concentric hole 36 formed at the bottom of the hole 30 to project out of the cylinder part 3. A seal 37 is provided in the hole 36, a part of the outwardly projecting rod 35 is covered with a dust boot 42, the bottom of which is fixed to the cylinder part 3, and a tip end 35a of the rod 35 is interconnected to a clutch pedal 38. A space surrounded by the hole 30, the cylindrical member 27 and the spring bearing 32 forms an air spring chamber 39 (an example of the stepping force loading mechanism) and is interconnected through a hole 40 to the piping 21.

The operation of the control device will be described hereunder. When compressed air is supplied from the air source 25 under the arrangement of FIG. 1, air pressure is supplied through the air hole 18, the groove 6, the air hole 19 and the piping 23 to the air clutch 24, thus the clutch 24 is brought to an engaged condition. At the same time the air pressure is supplied through the supply pressure hole 13 to the pneumatic feed-back mechanism 14, and the diaphragm bearing 10 is urged leftward (the direction of arrow $X_1$) in FIG. 1. In this instance a stepping force is not applied on a clutch pedal 38, and a pressure rise in the air spring chamber 39 causes the spring bearing 32 and the cylindrical member 27 to slide in the direction opposite to $X_1$ to contact with each corresponding shouldered part 29, 33. Accordingly, the control spring 34 is brought to the most compressed condition to strongly resist the spool valve 5 which tends to slide in the direction of $X_1$ by means of the feed-back mechanism 14. The spool valve 5 slides to a position where a side of the next to the spring bearing 8 is slightly connected to the groove 17 opening to the exhaust pipe 22, and a force exerted on the diaphragm bearing 10 in the direction of $X_1$ balances thereat with a force of the spring 34 in the direction opposite to $X_1$. However, since the spring 34 is tightly compressed in this instance, a pressure in the piping 23 corresponding thereto rises to bring the air clutch 24 to a firmly engaged condition.

When the clutch pedal 38 is slightly stepped on, the spring bearing 32 moves by that amount in the direction of $X_1$ against a pressure in the air spring chamber 39 and the control spring 34 is brought to a slightly elongated condition. The elongation of the spring 34 weakens the urging force against the spool valve 5 in the direction opposite to $X_1$, and the corresponding pressure in the piping 23 also lowers. When the pedal 38 is stepped on and further turned in the direction of $X_2$, the spring 34 elongates with the movement of the spring bearing 32 in the direction of $X_1$ and the corresponding pressure in the piping 23 lowers. The air clutch 24 is brought into a disengaged condition with the lowering of pressure in the piping 23. The pressure at which the clutch 24 is brought into the disengaged condition is set to a pressure in the piping 23 obtained immediately before the spring bearing 32 contacts with the cylindrical member 27 and thereafter moves in the direction of $X_1$ together with the number 27. Namely, a pressure applied on the spring bearing 32 from the spring chamber 39 inceases stepwise at a point where the spring bearing 32 contacts with the member 27 because a pressure receiving area increases. Therefore, an operator will sense the abrupt pressure change at his foot. When the pedal 38 is stepped on to its maximum extent against the increased force applied on the spring bearing 32 in the direction opposite to $X_1$, the spring 34 will elongate to its free state and a pressure from the air source 25 is relieved to the exhaust pipe 22, thus pressurized state in the piping 23 will be released.

When the stepping force is reduced from the maximum depression of the pedal 38, the pedal 38 will turn in the direction opposite to $X_2$ because the spring bearing 32 slides in the direction opposite to $X_1$ together with the cylindrical member 27 by means of the pressure in the air spring chamber 39. When the spring bearing 32 slides in the direction opposite to $X_1$ to compress the control spring 34, the corresponding pressure in the piping 23 rises. Then, when the cylindrical member 27 contacts with the shouldered part 29, the member 27 will leave the spring bearing 32 to have the operator sense a returning force of the pedal 38 in the direction opposite to $X_2$ being abruptly weakened. Thereafter, when the member 27 is slightly spaced apart from the spring bearing 32, the clutch 24 will function to be engaged and further releasing of the stepping force on the pedal 38 will cause the spring bearing 32 to compress the spring 34 to its maximum extent by means of the pressure in the chamber 39, so that the pressure in the piping 23 will rise to the highest pressure to bring the air clutch 24 to the firmly engaged condition.

Figure 2:
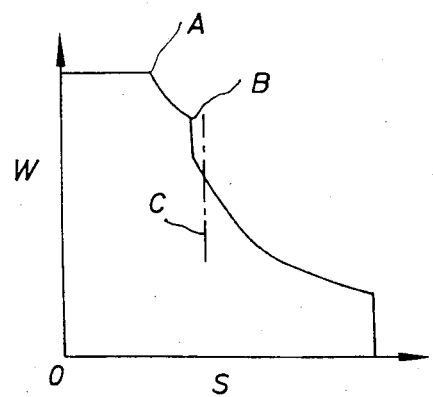
FIG. 2 is a graph showing a relation between pedal stroke and pedal load.

Incidentally, the above behavior of actuation is graphed as shown in FIG. 2. In FIG. 2, the abscissa represents a pedal stroke S in which 0 corresponds to the maximum stepping amount, and the ordinate represents a pedal load W. A is a point where the spring bearing 32 contacts the control spring 34 being under free state, B is a point where the spring bearing 32 leaves the cylindrical member 27, and a broken line C indicates a clutch engaging point.

EFFECT OF THE INVENTION

Since the supply pressure control device which interrupts actuation of the air clutch is provided in the present invention, it will become possible to readily realize that the air clutch permits an operator to perform engaging/disengaging work easily with a small force.

Further, according to the above embodiment, an operator can exactly sense the moment when the clutch engages in operating the clutch pedal 38 through the stepwise change in a returning force of the pedal 38 at the time of engagement of the clutch 24, thus the clutch engaging operation becoming easy.

MODIFICATIONS AND ALTERNATE EMBODIMENTS (a) As shown in FIG. 1, a spring 43 (an example of the stepping force loading mechanism) urging the clutch pedal 38 in the direction opposite to $X_2$ may be fitted to the pedal 38. The spring 43 may be fitted for the purpose of supplementing the urging force of the air spring chamber 39, and the chamber 39 may be omitted.

Figure 3:
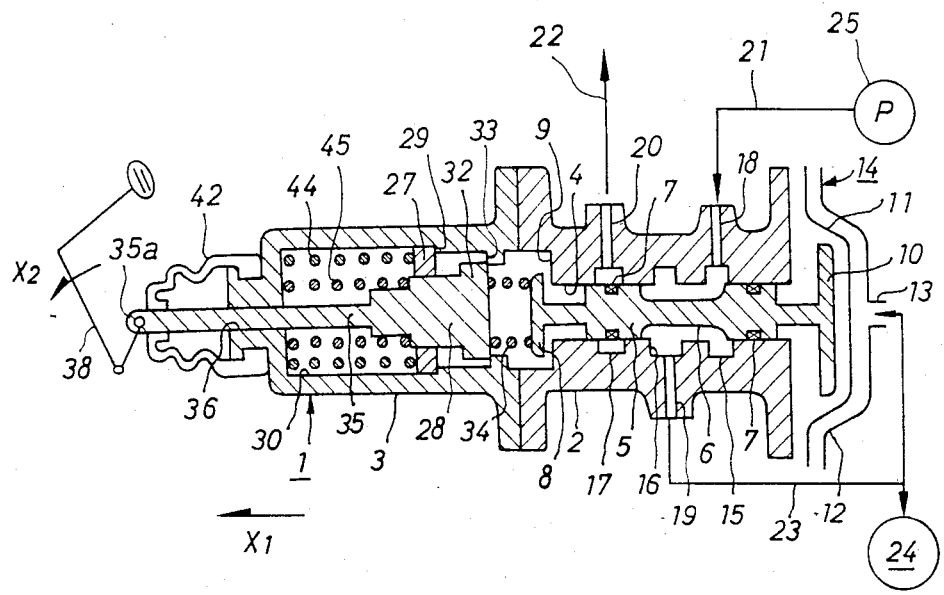
FIGS. 3 and 4 are vertical sectional schematic drawings of other embodiments.

(b) As shown in FIG. 3, compressed coil springs 44, 45 (an example of the stepping force loading mechanism) may be provided between both the cylindrical member 27 and the spring bearing and a bottom face of the hole 30 respectively in place of the air spring chamber 39 (FIG. 1). The seals 26, 31, 37 (FIG. 1) can be omitted in this instance.

Figure 4:
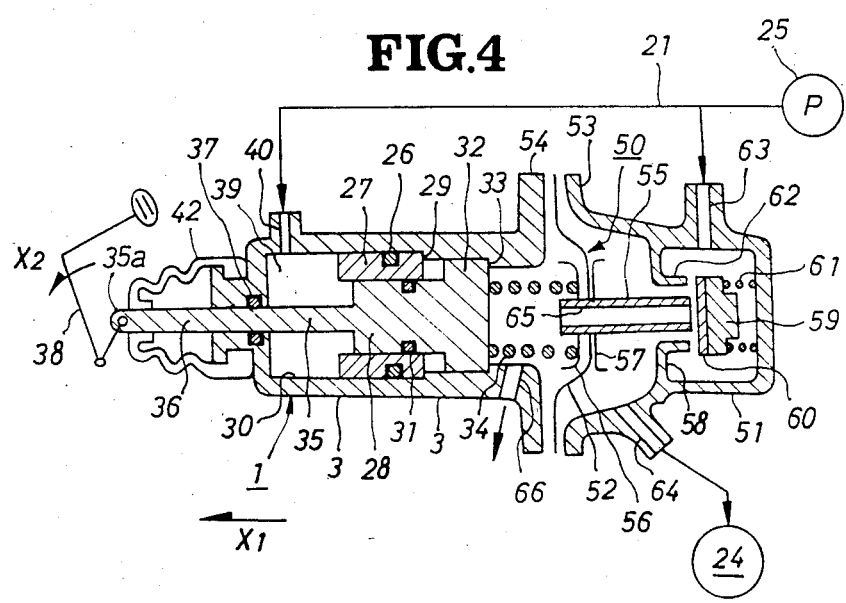

(c) As shown in FIG. 4, a valve part 51 incorporating a pneumatic feed-back mechanism 50 may be employed in place of the valve part 2 (FIG. 1). In FIG. 4, a diaphragm 52 composing the mechanism 50 is airtightly sandwiched at its outer peripheral edge by both outer peripheral side flanges 53, 54 of the valve part 51 and the cylinder part 3, and at its inner peripheral edge by two flanges 56, 57 formed on a cylindrical push rod 55 disposed at a center axis thereof. The control spring 34 contacts with a flange 56 at the side of the cyliner part 3 to urge it in the direction opposite to $X_1$. A right end part of the push rod 55 of FIG. 4 fits in an upward flange 58 formed inside of and integrally with the valve part 51 with a clearance left therebetween, and its tip end contacts with a poppet valve 59. The poppet valve 59 is concentrically disposed in the valve part 51 and has an integral sealing member 60 at the side of the push rod 55, and is urged in the direction of $X_1$ by means of a weak coil spring 61. Further, a cylindrical valve seat 62 is provided at an inner peripheral end of the flange 58. Incidentally, an air hole 63 is interconnected to the piping 21, an air hole 64 is interconnected to the air clutch 24, and air holes 65, 66 in the rod 55 are provided for exhausting purpose.

Figure 5:
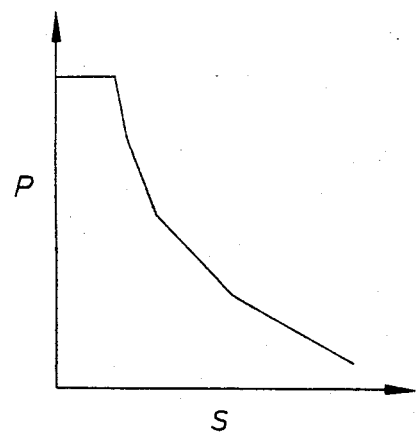
FIGS. 5 and 6 are graphs showing operating characteristics for a multi-stage spring and a conical spring used as the control spring.
Figure 6:
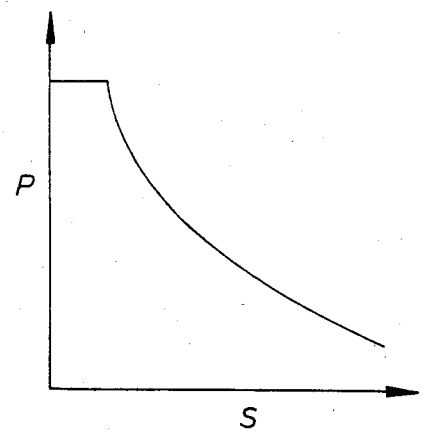

(d) The control spring 34 may be of a multi-stage spring type or a conical spring type. An example of characteristics for the multi-stage spring type is shown in FIG. 5, and that the conical spring type is shown in FIG. 6. The abscissa represents the stroke S of the clutch pedal 38 and the ordinate represents a supply pressure P to the air clutch 24, and the stroke S is zero for the maximum stepping amount.

(e) In FIG. 3, the spring bearing 32 may be directly fitted in the hole 30 by omitting the member 27, an irregular pitch spring may be compressively provided in place of the springs 44, 45 to make a load change point of the irregular pitch spring coincide approximately with the engaging point of the clutch 24.

(f) In FIG. 2, the clutch operation will become even easier if the point B is matched to a half-engaged condition of the clutch.

Figure 9:
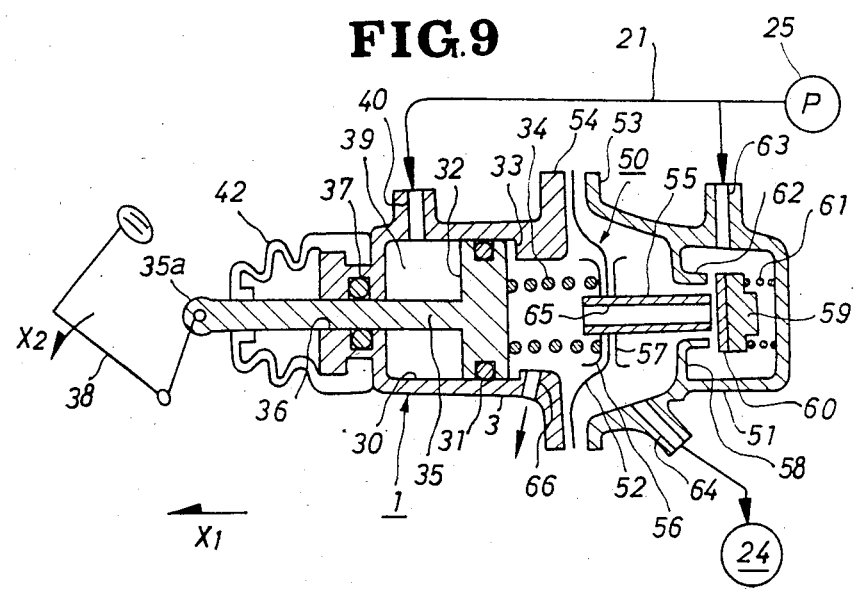

(g) Mechanisms such as shown in FIG. 7, FIG. 8 and FIG. 9 may be employed as other embodiments resembling FIG. 1, FIG. 2 and FIG. 3 respectively. In FIG. 7, FIG. 8 and FIG. 9, the ring-shaped seal 26, the cylindrical member 27, the column 28, the shouldered part 29 and the spring 45 are omitted. In these embodiments, however, the effect of exactly sensing the time of engagement of clutch is not obtainable though their mechanisms can be simplified.

What is claimed is:

1. A supply pressure control device for a pneumatic clutch comprising:
   a valve for controlling pneumatic pressure supplied to a pneumatic clutch, having means for connection to a source of pneumatic pressure, and means for supplying clutch supply pressure to a pneumatic clutch;
   means for connection to a clutch pedal;
   a pneumatic feed-back mechanism providing pneumatic clutch supply pressure to said valve in the direction which tends to reduce clutch supply pressure,
   a control spring elastically urging said valve in the direction which tends to increase clutch supply pressure against the pneumatic feedback mechanism,
   a spring bearing operable to change a resilient force of the control spring, the spring bearing being connected the means for connection to a clutch pedal in order to actuate the spring bearing in the direction of reducing the resilient force of the control spring when the clutch pedal is depressed, and
   a stepping force loading mechanism for resisting movement of the spring bearing in response to movement of the means for connection to a clutch pedal corresponding to depression of the clutch pedal,
   wherein the spring bearing operable to change the resilient force of said control spring is formed in a piston-shape, wherein an air spring chamber urging the control spring in the direction of compression is formed in a cylinder part of the valve which receives the spring bearing, wherein the air spring chamber serves as said stepping force loading mechanism, and
   wherein a cylindrical member is fitted so as to freely slide in said cylinder part, a column formed on said spring bearing is fitted so as to freely slide in the cylindrical member, and a shouldered part is formed on an inner peripheral surface of the cylinder part limiting sliding motion of the cylindrical member to the control spring side.

2. A supply pressure control device for a pneumatic clutch as set forth in claim 1, in which a spool valve having an annular groove on its outer periphery is employed as said valve, a second spring bearing is provided at one end of the spool valve which contacts said control spring, a diaphragm mechanism is provided at the other end of the spool valve, and the diaphragm mechanism is actuated by the pneumatic clutch supply pressure.

3. A supply pressure control device for a pneumatic clutch as set forth in claim 1, in which a spring urging said means for connection to a clutch pedal in the direction opposite to the the direction corresponding to depression of the clutch pedal is said stepping force loading mechanism.

4. A supply pressure control device for a pneumatic clutch as set forth in claim 1, in which a multi-stage spring is used as said control spring.

5. A supply pressure control device for a pneumatic clutch as set forth in claim 1, in which a conical spring is used as said control spring.

6. A supply pressure control device for a pneumatic clutch as set forth in claim 1, in which said pneumatic feed-back mechanism has an airtight diaphragm, a push rod at a center of the diaphragm, and a valve opened and closed by the push rod.

7. A supply pressure control device for a pneumatic clutch as set forth in claim 1, in which the resistance of said stepping force loading mechanism changes stepwise in the course of movement of the means for connection to a clutch pedal corresponding to a clutch pedal stroke, and its change point is caused to approximately match an engaging point of the pneumatic clutch.

8. A supply pressure control device for a pneumatic clutch as set forth in claim 1, in which the spring bearing leaves said cylindrical member when the pneumatic clutch becomes half-engaged.

9. A supply pressure control device for a pneumatic clutch as set forth in claim 7 in which a spring bearing changing the urging force of said control spring is formed into a piston-shape, and an air spring chamber urging the control spring in the direction of compression is formed in a cylinder part which receives the spring bearing, and wherein the air spring chamber serves as said stepping force loading mechanism.

10. A supply pressure control device for a pneumatic clutch comprising:
    a valve for controlling pneumatic pressure supplied to a pneumatic clutch, having means for connection to a source of pneumatic pressure, and means for supplying clutch supply pressure to a pneumatic clutch;
    means for connection to a clutch pedal;
    a pneumatic feed-back mechanism providing pneumatic clutch supply pressure to said valve in the direction which tends to reduce clutch supply pressure,
    a control spring elastically urging said valve in the direction which tends to increase clutch supply pressure against the pneumatic feed-back mechanism,
    a spring bearing operable to change a resilient force of the control spring, the spring bearing being connected the means for connection to a clutch pedal in order to actuate the spring bearing in the direction of reducing the resilient force of the control spring when the clutch pedal is depressed, and
    a stepping force loading mechanism for resisting movement of the spring bearing in response to movement of the means for connection to a clutch pedal corresponding to depression of the clutch pedal, wherein a cylindrical member is fitted so as to freely slide in said cylinder part, a column formed on said spring bearing is fitted so as to freely slide in the cylindrical member, and a shouldered part is formed on an inner peripheral surface of the cylinder part limiting sliding motion of the cylindrical member to the control spring side.

* * * * *